(12) United States Patent
Knoerle et al.

(10) Patent No.: US 7,489,769 B2
(45) Date of Patent: Feb. 10, 2009

(54) METHOD AND SYSTEM FOR PROVIDING A CONTINUOUS TONE SOURCE USING A NETWORK NODE

(75) Inventors: Joseph M. Knoerle, Atlanta, GA (US); Stephen R. Lapierre, Union City, GA (US); Zeeman Z. Zhang, Marietta, GA (US)

(73) Assignee: Jasper Wireless LLC

( * ) Notice: Subject to any disclaimer, the term of this patent is extended or adjusted under 35 U.S.C. 154(b) by 517 days.

(21) Appl. No.: 10/453,534

(22) Filed: Jun. 4, 2003

(65) Prior Publication Data
US 2003/0235283 A1 Dec. 25, 2003

Related U.S. Application Data

(63) Continuation of application No. 09/461,737, filed on Dec. 16, 1999, now Pat. No. 6,597,780.

(51) Int. Cl.
*H04M 11/00* (2006.01)
*H04M 3/42* (2006.01)

(52) U.S. Cl. .......................... 379/101.01; 379/211.01; 379/215.01

(58) Field of Classification Search ............ 379/215.01, 379/211.04, 265.02, 266.01, 88.26, 207.14, 379/266.03, 101.01, 266.05, 211.01; 370/354; 455/462
See application file for complete search history.

(56) References Cited

U.S. PATENT DOCUMENTS

| | | | | |
|---|---|---|---|---|
| 4,951,310 | A * | 8/1990 | Honda et al. ............ | 379/266.05 |
| 5,475,748 | A * | 12/1995 | Jones ..................... | 379/211.04 |
| 5,535,270 | A * | 7/1996 | Doremus et al. ........ | 379/266.01 |
| 5,633,924 | A * | 5/1997 | Kaish et al. ............. | 379/266.03 |
| 5,668,862 | A * | 9/1997 | Bannister et al. ....... | 379/207.14 |
| 5,701,301 | A | 12/1997 | Weisser, Jr. | |
| 5,838,774 | A | 11/1998 | Weisser, Jr. | |
| 5,960,064 | A * | 9/1999 | Foladare et al. ......... | 379/88.26 |
| 5,999,611 | A | 12/1999 | Tatchell et al. | |
| 6,031,905 | A * | 2/2000 | Furman et al. .......... | 379/215.01 |
| 6,353,662 | B1 * | 3/2002 | Foladare et al. ........ | 379/101.01 |
| 6,363,411 | B1 | 3/2002 | Dugan et al. | |
| 6,374,102 | B1 | 4/2002 | Brachman et al. | |

(Continued)

*Primary Examiner*—Thjuan K Addy
(74) *Attorney, Agent, or Firm*—Connolly Bove Lodge & Hutz LLP; Myron Keith Wyche

(57) ABSTRACT

A system and method for providing an on-hold call with a selectable continuous tone source using a service node, comprising a service switching point of a central office connected to a service logic program provisioned on a service node. Using the capabilities of the service node, the service logic program plays a continuous tone through a permanent trunk line connecting the service node to the service switching point. When the service switching point puts a call on hold, the service switching point connects the call through the permanent trunk line to the service logic program that is playing the continuous tone. As a result, the caller hears the continuous tone while the service switching point has the call on hold. In addition, the present invention provides a dual tone multifrequency administrative interface on the service logic program of the service node, which enables a customer to dial the interface, enter a passcode for access, and then choose between a variety of tone types such as a dial tone, a busy signal, a normal ring tone, a reorder signal (fast busy signal), a continuous busy signal, and a continuous ring tone.

34 Claims, 5 Drawing Sheets

U.S. PATENT DOCUMENTS 6,901,266 B2 *  5/2005  Henderson .................. 455/462
6,940,962 B1 *  9/2005  Hansen et al. ......... 379/265.02
6,952,416 B1 * 10/2005  Christie, IV ................ 370/354

* cited by examiner

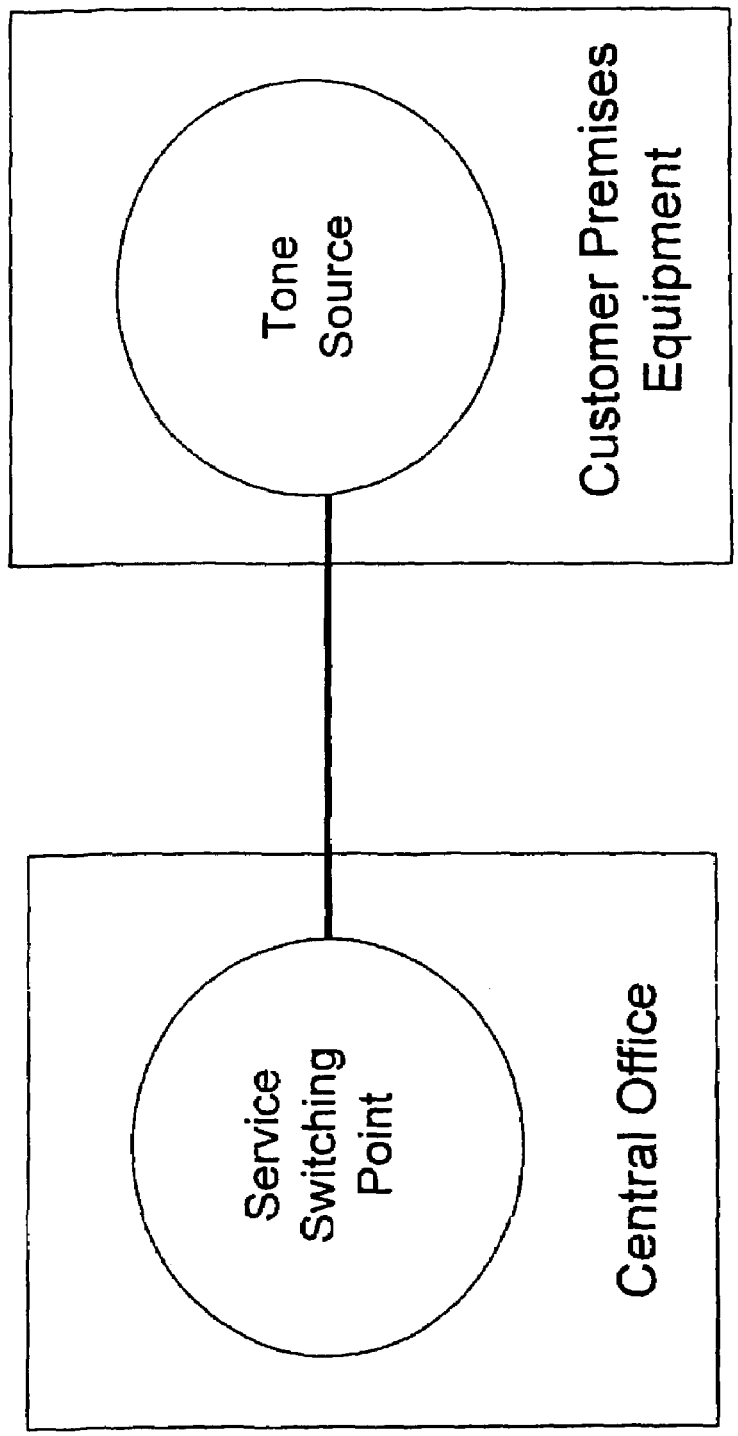
Figure 2 PRIOR ART

METHOD AND SYSTEM FOR PROVIDING A CONTINUOUS TONE SOURCE USING A NETWORK NODE

This application claims priority from U.S. patent application Ser. No. 09/461,737, filed Dec. 16, 1999 now U.S. Pat. No. 6,597,780.

BACKGROUND

1. Field of the Invention

The present invention relates to the field of switched telephony, and more particularly, to a method and system for providing a selectable continuous tone source from a service node to an end user.

2. Background of the Invention

Many Advanced Intelligence Network (AIN) telephone services use the capabilities of a service node (also referred to as a service circuit node) for intelligent call routing. In a typical routing scenario, the service node accepts an incoming call, places an outgoing call in response to the incoming call, and connects the incoming call to the outgoing call. Usually, once the calls are connected, the service node transfers the connected call to a service switching point to disencumber the service node (which is a more limited intelligent network resource). To transfer the connected call, the service node must place the incoming and outgoing calls on hold and transfer them to the service switching point with connection instructions, at which point the service switching point re-establishes the connection. This transfer typically occurs immediately after the service node has executed its intelligent routing functions and before any voice, data, or other communication is conducted over the completed connection.

The principal drawback to this routing strategy is a delay associated with the transfer from the service node to the service switching point. Depending on the particular type of AIN platform, the transfer may last up to three seconds. During this period, when both the incoming and outgoing calls are on hold, the customers on either side of the communication hear silence. As a result, the customers may become confused, mistakenly think the call has been disconnected, and hang up. This possibility is especially true for the calling party who has dialed a number only to experience an extended period of silence. Obviously, such a call switching deficiency severely detracts from any telephone service that uses this service node transfer and reduces the likelihood that a customer will subscribe to the service.

In addition to the call transfer problem, service nodes also put calls on hold to perform other functions, such as looking up data or communicating with other AIN components, e.g., service control points. An AIN service such as voicemail could present this situation. In such a case, the period on hold lasts as long as it takes the service node to process the information. Without connecting a music-on-hold source to the call during the processing, the customer hears silence while the service node has the call on hold.

Telephone service providers (hereinafter, referred to as "Telcos") have attempted to address the on-hold silence by connecting the calls to a music-on-hold source during the transfer or processing period. Traditionally, the music-on-hold source is a standard audible ringing tone source generated at a central office. FIG. 1 illustrates this architecture. Audible ringing is the typical sound heard after dialing a telephone number, consisting of two seconds of ringing followed by four seconds of silence. Unfortunately, the four seconds of silence is often greater than the on-hold period during a call transfer (approximately three seconds) or during a processing function (duration varies). Thus, even with audible ringing connected to the on-hold calls, the customer often hears just a portion of a ring or no ringing at all. In either case, the customer could still possibly be confused and hang up. Moreover, because it is the caller who is most likely to be confused, and not the subscriber (the called party), the Telco does not have the opportunity to explain this idiosyncrasy of the service to avoid the confusion. Thus, providing audible ringing for music-on-hold fails to solve the problem.

Telcos provide audible ringing through a physical connection to a standard ringing tone plant in a central office. The primary purpose of the tone plant is to provide the audible ringing heard after placing a call. The Telcos use the tone plant for music-on-hold only to take advantage of an existing resource. As an alternative to audible ringing, a Telco could develop a different ringing or tone pattern. However, the Telco would have to consult with an outside vendor, at considerable expense, to create a new type of ringing tone plant source. In addition, the Telco would have to create a new plant source for each type of tone source it desired.

Another drawback to using a tone source generated by the central office concerns the prevalence of equipment failures and the lack of alarming capabilities. Providing the tone source with the central office may require a physical connection to manufacturer discontinued equipment. Such discontinued equipment is prone to irreparable failure because of its age and the fact the manufacturer no longer produces the discontinued equipment or components of the equipment. Further compounding this reliability problem, if the central office tone source does fail, the central office has no means for alarming the customer about the failure. Thus, the customer would not be aware that the tone source is unavailable and would again be left with silence during the on-hold period.

Other solutions to on-hold silence present further drawbacks. Telcos can provide a music-on-hold tone source provisioned on customer premises equipment or on other tone generating equipment connected to the central office (e.g., radio playing). FIG. 2 shows the architecture for this solution. Although this solution allows a customer to customize the on-hold tone source, the architecture requires a permanent, dedicated line from the central office to the customer premises equipment. Because the line is dedicated, multiple customers cannot share the tone source. In addition, the customer is burdened with the expense and responsibility of continuously monitoring the tone source for failure situations.

SUMMARY OF THE INVENTION

The present invention is a system and method for providing an on-hold call with a selectable continuous tone source using a service node. The present invention comprises a service switching point (SSP) of a central office (CO) connected to a service node (SN) provisioned with a service logic program (SLP). Using the capabilities of the service node, the service logic program plays a continuous tone through a permanent trunk line connecting the service node to the service switching point. When the service switching point puts a call on hold, the service switching point connects the call through the permanent trunk line to the service logic program that is playing the continuous tone. As a result, the caller hears the continuous tone while the service switching point has the call on hold.

To enable users to select tones, the present invention further provides a dual tone multifrequency (DTMF) administrative interface on the service logic program of the service node. A customer can dial this interface, enter a passcode for access, and then choose between a variety of tone types such as a dial tone, a busy signal, a normal ring tone, a reorder signal (fast busy signal), a continuous busy signal, and a continuous ring tone.

The system architecture of the present invention uses a service switching point connected to a service node through at least two lines. The first line 314 passes active calls between the service switching point and the service node, and is preferably a basic rate interface (BRI) connection. The second line 316 is the permanent trunk line through which the continuous tone source is delivered, and is preferably a basic rate interface integrated service digital network (BRI/ISDN) connection. As would be apparent to one skilled in the art, the service switching point could be one or more service switching points located together or apart.

The present invention functions within the AIN network. AIN networks use a complex, high speed, high traffic volume data packet-switched messaging system to provide versatility in the handling of telephone calls. The Advanced Intelligent Network System is described in U.S. Pat. No. 5,701,301 and U.S. Pat. No. 5,838,774, which are hereby incorporated by reference.

The AIN enables telecommunications call control and database access from any computer or switching system connected to the Signaling System 7 (SS7) network. The Signaling System 7 network refers to the current implementation of the Common Channeling Interoffice Signaling control network used in the United States. The Advanced Intelligent Network (AIN) is a standard call control protocol that uses the SS7 network for message transport.

AIN infrastructures of the public switched telephone network include service switching points, service nodes, signal transfer points (STPs), and service control points (SCPs) with databases. The service control point is a computer that holds, accesses, and maintains the database and communicates with the service switching point in directing call routing. The database stores subscriber-specific information used by the network to route calls. The service switching point communicates with the service control point and queries the service control point for subscriber-specific instructions as to how calls should be completed. The signal transfer point is a packet switch that shuttles messages between the service control point and the service switching point. The service node is a smart termination that can assess incoming call information and make appropriate connections. In most implementations of a public switched telephone network, service control points, service switching points, and service nodes are also provided in redundant mated pairs to ensure network reliability.

With specific reference to the present invention, service nodes are intelligent components of the AIN network that read call information, determine call destinations, and issue instructions, while service switching points simply follow routing instructions and switch calls. The service node can be provisioned with a service logic program, which is an application that directs the actions of the service node.

Based on the above-described architecture, the present invention operates as follows. The service switching point connected to the service node receives an incoming call and forwards the call to the service node. The service node processes the call according to the particular AIN service that the service node is providing. The processing could include such actions as consulting a database for customer information, communicating with a service control point for routing information, or placing another call. In any case, if the action the service node must take will last a duration that justifies the use of a continuous tone source (typically, more than one or two seconds), the service node directs the service switching point to put the incoming call on hold. Once the call is on hold, the present invention uses the service switching point to connect the incoming call to the service logic program on the service node. Thus, while the service node is taking action, the caller placing the incoming call hears the continuous tone being played by the service logic program.

In addition to receiving incoming calls, the service node also places outgoing calls. Often, the service node places an outgoing call for the purpose of connecting the answered outgoing call with an incoming call. The present invention provides the same continuous tone source for these outgoing calls, when the outgoing calls are placed on hold. Further, once a connection is made, the service node typically transfers the incoming and outgoing calls to the service switching points to free its resources for processing other calls. During this transfer period, when the incoming and outgoing calls are on hold, the present invention provides a continuous tone source to the calling party and the called party to avoid a confusing period of silence that gives the impression of a disconnected call.

In the preferred embodiment of the present invention, the trunk line between the service logic program and the service switching point provides a continuous tone source for a flexible call forwarding service. For this telephone service, the service node receives from the calling party an incoming call to the forwarding destination of the called party (subscriber). In response, the service node must determine the forwarding destination, determine how to route the call (including, for example, which outgoing port to use), set up appropriate billing and call identity information, place an outgoing call to the forwarding destination, connect the incoming call to the outgoing call, and transfer the connected calls to the service switching point to save the resources of the service node. During the transfer, which lasts from approximately one to three seconds, the service node places both the incoming and outgoing calls on hold. Without a music-on-hold source, at this point the calling party and called party would hear silence. However, according to the present invention, the service switching point connects the incoming and outgoing calls to the service logic program while the service node is transferring the calls to the service switching point. Thus, the calling party and called party hear the continuous tone from the service logic program until the service node completes the transfer and the calls are permanently connected through the service switching point.

In another preferred embodiment of the present invention, the trunk line between the service logic program and the service switching point provides a continuous tone source for a simultaneous ring service. For this service, the service node receives an incoming call through a service switching point, consults a database to determine the group of phone numbers to simultaneously ring, places outgoing calls to each phone number in the group, and connects the incoming call to the outgoing call that is first answered. Like flexible call forwarding, once the incoming and outgoing calls are connected, the service node transfers the calls to the service switching point to save its resources. During this transfer, the present invention provides a continuous tone through the connection from the service logic program to the service switching point.

In another preferred embodiment, the present invention can also provide a continuous tone for a star code feature service. This service enables a customer to put an incoming call on hold at the central office while placing another outgoing call from the service node or using some other AIN service. If the outgoing call is answered and connected to the incoming call, the present invention provides a continuous tone through the connection from the service logic program to the service switching point, during transfer of the calls to a service switching point. If the service node is completing some other AIN service that involves a call that cannot receive an audible ringing tone from the central office, the present invention provides a continuous tone through the service logic program and service switching point connection.

Therefore, the present invention is a system and method for providing a continuous tone source to a call that has been placed on hold. The tone indicates that telephone routing is in process and eliminates the silence suggestive of a disconnected call. Further, the system and method places the burden of creating and maintaining the tone source on a Telco rather than the customer. Finally, the system and method is flexible such that a different tone source can be easily generated for particular situations, without having to consult with expensive outside vendors.

Accordingly, it is an object of the present invention to provide a continuous tone source for on-hold calls using a service node.

It is another object of the present invention to eliminate the customer confusion associated with a period of silence during service node call processing or call transfer.

It is another object of the present invention to provide a Telco with a means for creating and modifying continuous tone sources without having to consult with expensive outside vendors.

It is another object of the present invention to provide an administrative interface through which a customer can select a continuous tone to be heard when calls are put on hold.

It is another object of the present invention to provide a continuous tone source monitored by a Telco for alarm situations, thereby relieving the customer of the burden of maintaining a continuous tone source for on-hold calls or the burden of depending on a tone source generated by a central office subject to frequent failures of manufacturer discontinued equipment.

It is another object of the present invention to provide a continuous tone source that multiple customers can use.

These and other objects of the present invention are described in greater detail in the detailed description of the invention, the appended drawings, and the attached claims.

DESCRIPTION OF THE DRAWINGS

FIG. 2 is a schematic diagram of a music-on-hold tone source provisioned on customer premises equipment.

DETAILED DESCRIPTION OF THE INVENTION

Figure 1:
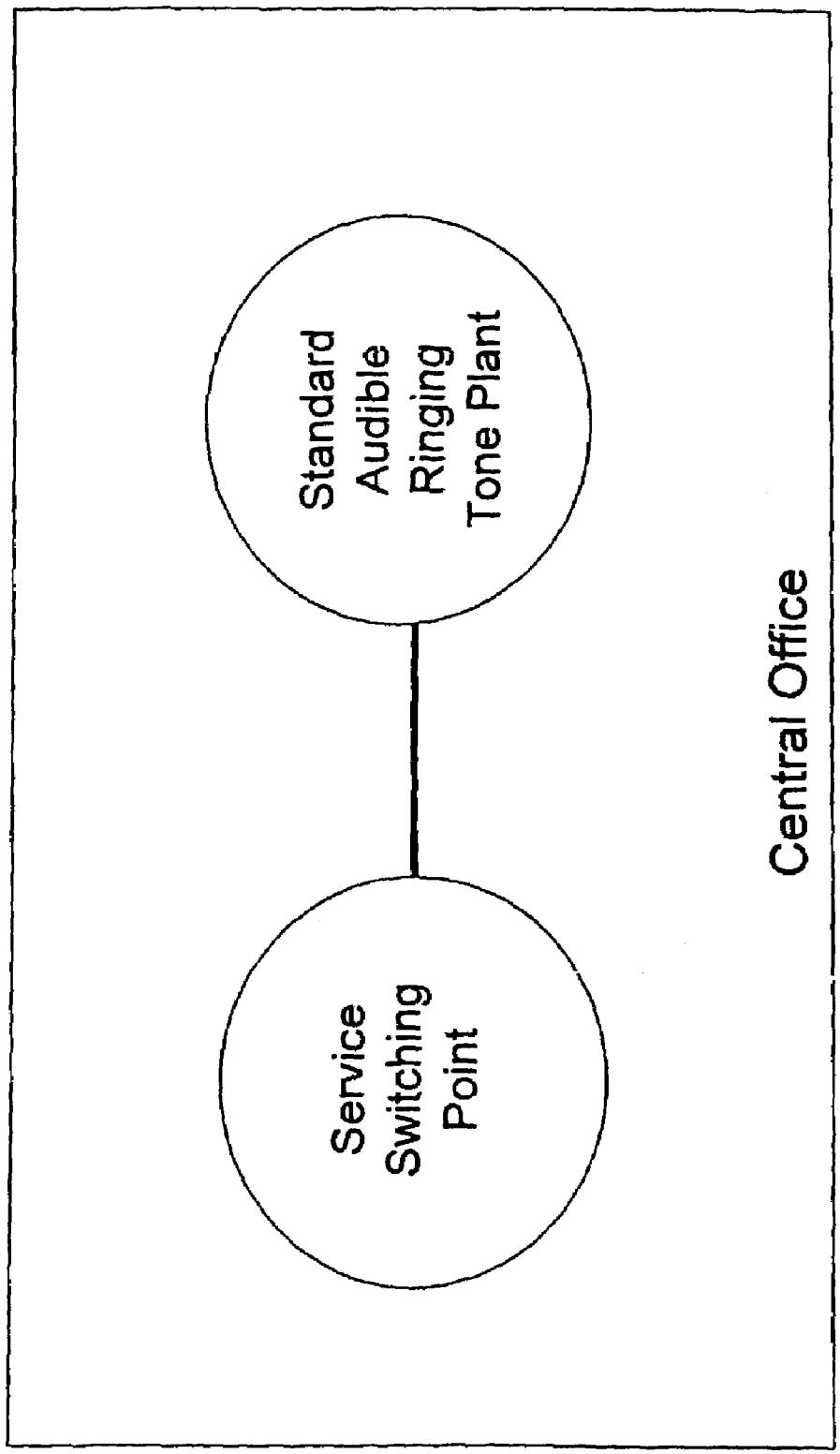
FIG. 1 is a schematic diagram of a music-on-hold source generated at a central office that is connected to a service node multiple line hunt group.
Figure 3:
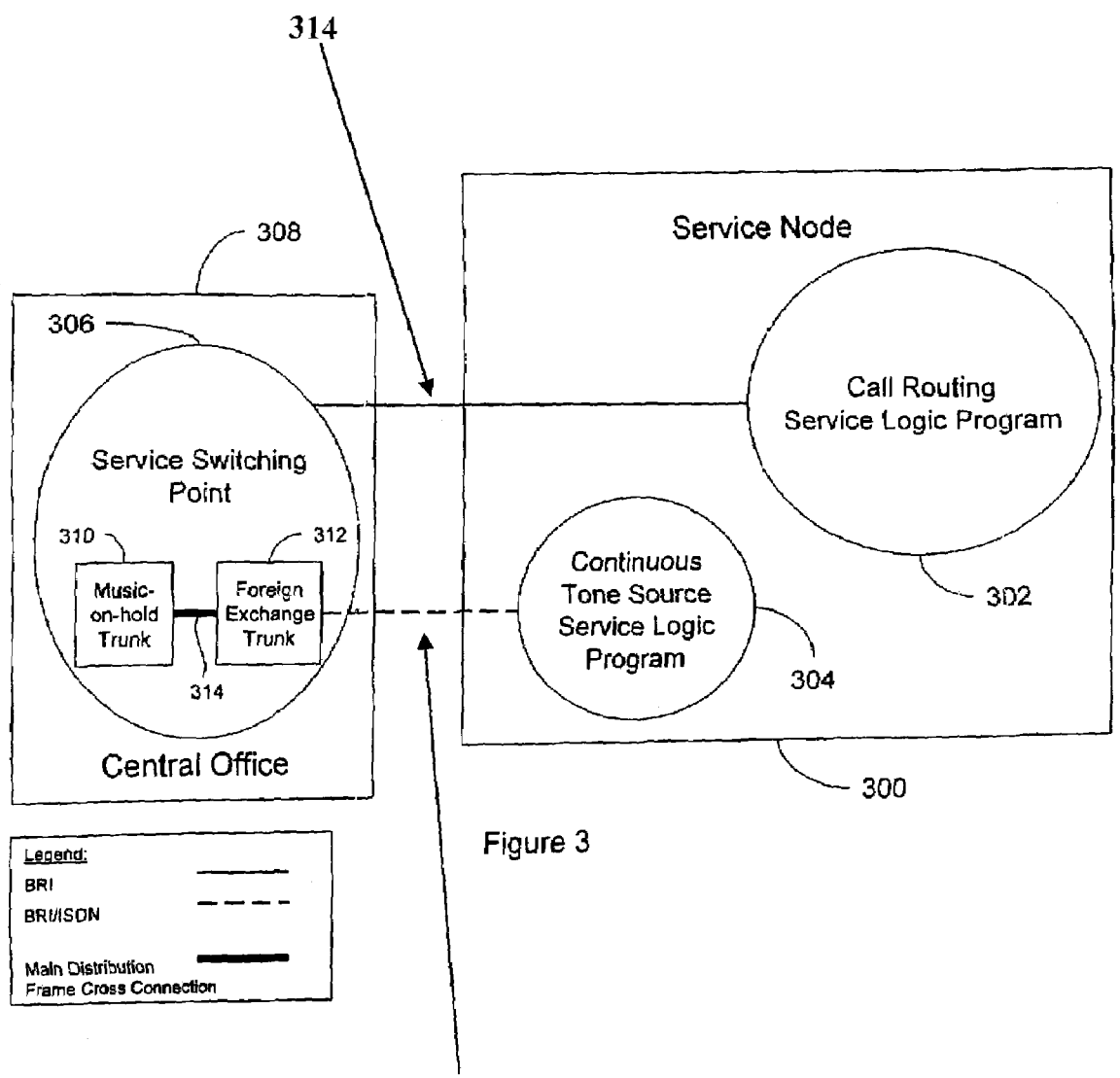
FIG. 3 is a schematic diagram of the system architecture of the present invention.

The present invention is a system and method for providing an on-hold call with a selectable continuous tone using a service node. As shown in FIG. 3, the primary components of the present invention are a service node 300, a tone service logic program 304, a call routing service logic program 302, and a service switching point 306. Service node 300 receives calls, places calls, and executes the intelligent actions required by an AIN service. Tone service logic program 304 produces the continuous tone. Call routing service logic program 302 computes call processing decisions based on the parameters of a particular AIN service and issues call routing instructions. Service switching point 306 follows the routing instructions and terminates calls to specified destinations, such as call routing service logic program 302 and music-on-hold trunk 310. Together, these components replace the confusing silence of the prior art systems with a continuous tone that signals to the caller or called party that call processing is in progress.

System Architecture

The present invention is based on a service node architecture and can be applied to any AIN service that requires a service node for call routing or processing. FIG. 3 illustrates an architecture representative of the present invention. Service node 300 contains call routing service logic program 302 and tone service logic program 304. Call routing service logic program 302 is connected to service switching point 306 of central office 308 through a standard basic rate interface (BRI) line 314. Tone service logic program 304 of service node 300 connects to service switching point 306 of central office 308 through a basic rate interface integrated services digital network (BRI/ISDN) line 316.

Call routing service logic program 302 provides the call routing or other intelligent actions required to execute a particular telephone service. For example, with a service node that provides simultaneous ring service, the service node reads the called party of the incoming call, looks up in a database the telephone numbers (e.g., home telephone number and cellular telephone number) associated with the called party (subscriber), places outgoing calls to each of the telephone numbers, monitors the calls for an answer, and connects the incoming call to the first outgoing call that is answered.

Tone service logic program 304 generates the continuous tone of the present invention. Thus, whenever a call at service switching point 306 is connected to tone service logic program 304, the person on the call hears the tone source that tone service logic program 304 is continuously playing. To create the continuous tone, tone service logic program 304 is programmed in a service logic program language to send a continuous tone of a particular type. Preferably, the continuous tone program is written in Lucent Technologies' Service Logic Language™ as follows: tone!send(tone=parameter). The parameter defines the desired tone source, e.g., a dial tone, a continuous busy signal, and a normal ring tone. Either the Telco or the customer, through a DTMF interface, sets the parameter.

As an additional feature, tone service logic program 304 has an administrative interface through which a customer can select from a variety of tone types. This administrative interface operates with dual tone multifrequency dialing. Thus, a customer can dial this administrative interface, enter a passcode for access, and choose between tone types such as a dial tone, a busy signal, a normal ring tone, a reorder signal (fast busy signal), a continuous busy signal, and a continuous ring tone.

As another feature, tone service logic program 304 contains a database listing the particular tone source each individual customer or telephone service receives. Tone service logic program 304 also monitors each tone source for failures. In this manner, if a tone source becomes unavailable, tone service logic program 304 can identify the affected customers and the Telco can notify those customers and take appropriate corrective action. In contrast to tone sources generated by a central office, this feature provides an alarm that ensures that a customer knows when a tone source is unavailable and provides an opportunity for the Telco and the customer to use interim corrective measures, e.g., choosing an alternate tone source while the unavailable tone source is being repaired.

Service switching point 306 contains a music-on-hold trunk 310 in communication with a foreign exchange trunk 312 through a main distribution frame (MDF) cross connection 314. (A foreign exchange trunk is a central office trunk that has access to a distant central office. A main distribution frame is a wiring arrangement that connects the telephone lines coming from outside on one side and the internal lines on the other.) Music-on-hold trunk 310 can connect to any source of audible signaling, in either analog or digital form. In the present invention, however, tone service logic program 304 provides the audible signaling to the music-on-hold trunk 310 using a unique application of existing service switching point design. Foreign exchange trunk 312 has a permanent incoming seizure that triggers foreign exchange trunk 312 to use a hot line feature to place a call to tone service logic program 304. According to this hot line feature, when foreign exchange trunk 312 receives a signal, e.g., an off-hook signal, from music-on-hold trunk 310, it automatically calls tone service logic program 304 to connect to the continuous tone source.

Service switching point 306 internally connects the calling party to music-on-hold trunk 310 through the switching network via a one-way bridge in the network. Music-on-hold trunk 310 is physically cross-connected to tone service logic program 304 on the main distribution frame, thereby providing music-on-hold trunk 310 with the voice path for the tone source. Thus, a service switching point needing a music-on-hold source can be connected to a tone service logic program through the switched network and can be connected to that service logic program from anywhere within the switched network.

Using music-on-hold trunk 310, foreign exchange trunk 312, and the hot line feature, service switching point 306 provides a calling party with music-on-hold whenever the calling party is placed on soft hold or hard hold. A soft hold occurs during the transition time from the start of a switch hook flash period until reconnection to the calling party. A hard hold occurs as a result of either an ISDN call action or a dial access code programmed for the music-on-hold feature.

Although FIG. 3 depicts a single service switching point and service node, it should be understood that the architecture of the present invention is not limited to these single components. One or more service switching points could be connected to tone service logic program 304 to access the continuous tone. With multiple service switching points connected to tone service logic program 304, the present invention can furnish a continuous tone to the many customers connected to the multiple service switching points. The present invention is also not limited to one service node with one service logic program. One or more service nodes with one or more service logic programs could provide continuous tones for different groups of customers within an AIN network. In a typical example, a Telco could install and run up to fifteen different service logic programs on a single service node. The maximum number of service logic programs that can run on one service node depends largely on the specific service logic programs in use and factors related to system capacity such as processor usage and port usage. In addition, a single service logic program could support several different continuous tone connections to different foreign exchange trunk circuits connected to a single service node.

In another preferred embodiment of the present invention, the connection between tone service logic program 304 and service switching point 306 is a multiple line hunt group (MLHG). A multiple line hunt group is a group of associated lines provisioned under one main telephone number. In response to a call to the main number, the multiple line hunt group searches, or hunts, through the group of lines for an idle line and connects the call to that idle line. Generally, the lines associated with a multiple line hunt group belong to one customer and receive the same treatment, i.e., telephone services. Thus, for purposes of the present invention, tone service logic program 304 would provide a continuous tone source for each line of the multiple line hunt group. If tone service logic program 304 supplies continuous tone to more than one multiple line hunt group (i.e., more than one customer), then a separate line is required for each multiple line hunt group between tone service logic program 304 and the service switching point of each multiple line hunt group.

System Operation

Figure 4:
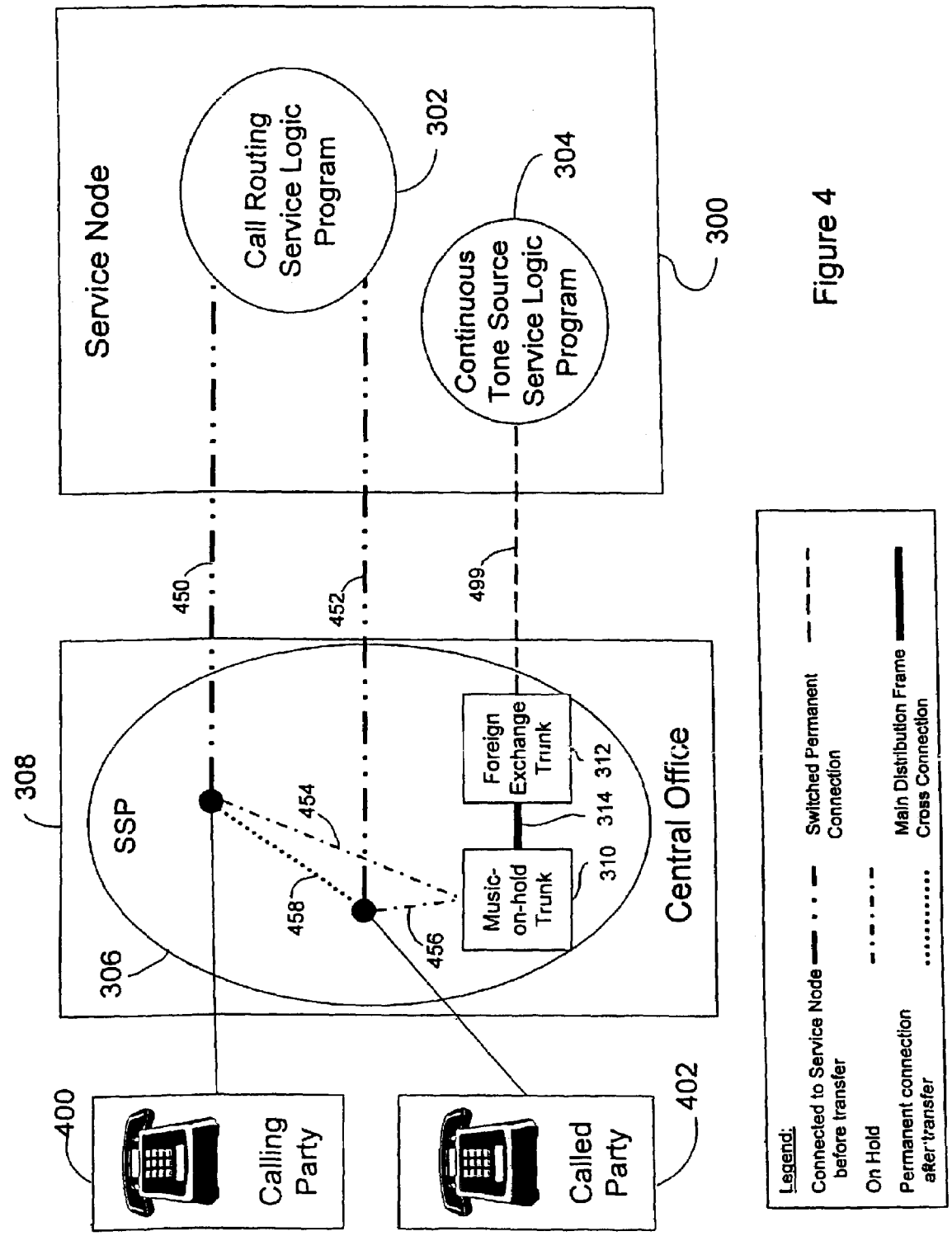
FIG. 4 is a schematic diagram of the system architecture of the present invention showing the call flow of a preferred embodiment of the present invention.
Figure 5:
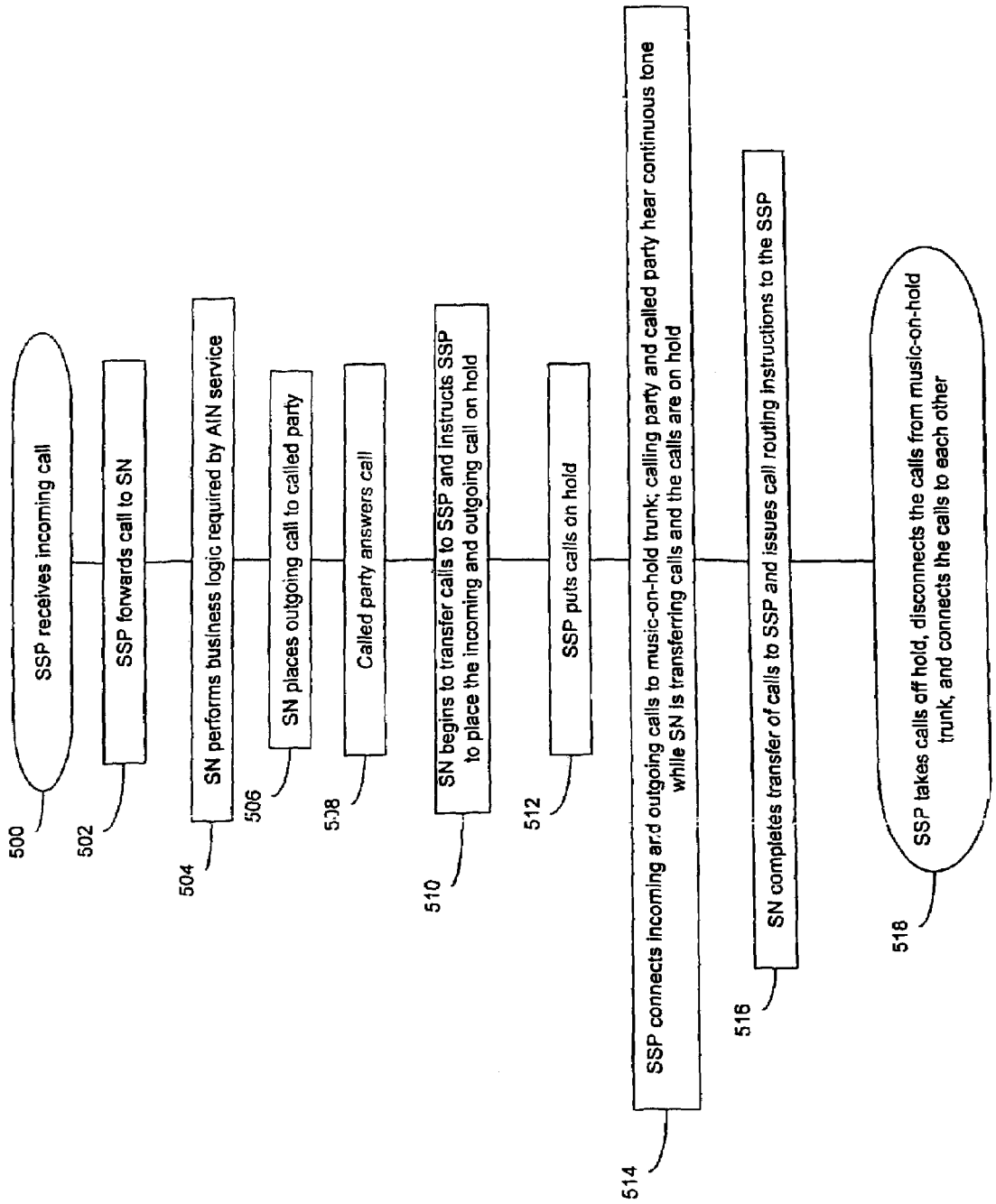
FIG. 5 is a flowchart tracing the steps of the present invention.

FIGS. 4 and 5 illustrate the call flow of a preferred embodiment of the present invention. Although the present invention is applicable to any situation in which a service node places a call on hold, the schematic of FIG. 4 and the flowchart of FIG. 5 trace the operation of the present invention in the context of flexible call forwarding. While the method described herein and illustrated in the figures contains many specific examples of call flow steps, these steps should not be construed as limitations on the scope of the invention, but rather as examples of call flow steps that could be used to practice the invention. As would be apparent to one of ordinary skill in the art, many other variations on the system operation are possible, including differently grouped and ordered method steps. Accordingly, the scope of the invention should be determined not by the embodiments illustrated by these examples, but by the appended claims and their equivalents.

FIG. 4 shows the call flows between the components of the present invention. The numbered lines 450, 452, 454, 456, and 458 between components represent sequentially completed connections in the process of the present invention. Line 450 represents the connection between service switching point 306 and call routing service logic program 302, which is made in response to a call from calling party 400. Line 452 represents the outgoing call placed by call routing service logic program 302 in response to the incoming call and in accordance with the flexible call forwarding service. Once called party 402 answers the outgoing call, call routing service logic program 302 associates the incoming call with the outgoing call, for purposes of terminating the calls together, and begins transferring the calls to service switching point 306. During this transfer, service node 300 places the calls on hold (lines 454 and 456) and service switching point 306 connects the calls to music-on-hold trunk 310 to receive the continuous tone from tone service logic program 304 through main distribution frame cross connection 314, foreign exchange trunk 312, and line 499. When service node 300 completes the transfer of the incoming call and outgoing call to service switching point 306, service switching point 306 tears down the connections to music-on-hold trunk 310 and terminates the calls to each other at service switching point 306 (line 458).

Overall, FIG. 4 shows the connections during the three principal stages of the present invention: 1) before the call transfer from the service node to the service switching point; 2) during the call transfer, while the calls are on hold; and 3) after the call transfer, when the calls are permanently connected at the service switching point. The flowchart of FIG. 5 describes these call flow stages in more detail.

As FIG. 5 shows, in step 500 service switching point 306 receives an incoming call from a calling party 400. The call hits a termination attempt trigger provisioned on service switching point 306. The termination attempt trigger corresponds to the particular service to which the called party has subscribed, e.g., simultaneous ring, and is provisioned on the service switching point 306 during initiation of the service. Once activated, the trigger queries service node 300 for call routing instructions. Alternatively, service switching point 306 does not have a trigger, in which case service switching point 306 forwards calls directly to service node 300.

In step 502, service switching point 306 forwards the call (and query, if a trigger is used) to service node 300. The call passes through the line connected to the call routing service logic program 302. In FIG. 4, line 450 represents this connection. At this time, calling party 400 hears the standard ringing produced by central office 308 (e.g., two seconds of ring followed by four seconds of silence).

In step 504, service node 300 performs the business logic required by the AIN service written in call routing service logic program 302. Service node 300 takes actions such as consulting a database or placing a separate outgoing call. For the flexible call forwarding service illustrated in FIGS. 4 and 5, service node 300 places an outgoing call to the forwarding destination designated by the subscriber, as shown in step 506. During steps 504 and 506, calling party 400 continues to hear the standard ringing produced by central office 308.

In step 508, the called party 402 (subscriber) at the forwarding destination answers the outgoing call. Answering the call completes the connection between call routing service logic program 302 and service switching point 306. In FIG. 4, line 452 represents this connection.

At this point, service node 300 has associated the incoming call with the outgoing call in preparation for connecting the calls to complete the call processing and to enable calling party 400 to communicate with called party 402. However, terminating these calls at service node 300 would occupy valuable processing capacity that could be used to support additional service-node-based AIN services. Therefore, preferably, service node 300 transfers the calls to service switching point 306 for termination at service switching point 306.

In step 510, service node 300 initiates this transfer and instructs service switching point 306 to put the calls on hold. Accordingly, in step 512, service switching point 306 places the incoming call and the outgoing call on hold.

In step 514, service switching point 306 connects the incoming call and the outgoing call to music-on-hold trunk 310 to provide a continuous tone source during the on-hold period. Connecting the calls to music-on-hold trunk 310 sends a signal through main distribution frame cross connection 314 to foreign exchange trunk 312. Foreign exchange trunk 312 has previously placed a hot line call to tone service logic program 304 to connect through a switched permanent connection to the continuous tone source. In FIG. 4, line 499 represents this switched permanent connection to tone service logic program 304, and lines 454 and 456 represent the on-hold connections between music-on-hold trunk 310 and both calling party 400 and called party 402, respectively.

The transfer from service node 300 to service switching point 306 takes approximately three seconds, during which time the calls are on hold and connected to tone service logic program 304. When the incoming call is put on hold, calling party 400 no longer hears the standard ringing from central office 308. Immediately thereafter, when the incoming call and outgoing call are connected to tone service logic program 304, calling party 400 as well as called party 402 hear the continuous tone produced by tone service logic program 304.

In step 516, service node 300 completes the transfer of the incoming call and the outgoing call to service switching point 306 and issues call routing instructions to service switching point 306. The instructions direct service switching point 306 to take the incoming and outgoing calls off hold, to tear down the connections to music-on-hold trunk 310, and to terminate the incoming and outgoing calls to each other. In step 518, service switching point 306 follows the service node instructions by taking the calls off hold, disconnecting the calls from music-on-hold trunk 310, and terminating the calls to each other at service switching point 306. When this final permanent connection (represented by line 458 in FIG. 4) is made, the calling party and called party no longer hear the continuous tone and have an open line through which to communicate.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for providing a continuous tone in voice communication networks, comprising:

a network node including a tone service logic program and a call routing service logic program to provide the continuous tone and call routing/switching instructions, respectively; and a switch configured to follow the call routing/switching instructions, wherein the network node is connected to the switch through at least one line configured to pass an active call, wherein the active call connections are transferred to the switch from the network node by the call routing service logic program, wherein, during the transfer, the call routing service logic program directs the switch to place the active call on hold and the service logic program provides a continuous tone to at least one party of the active call through a permanent trunk line connected from the service node to the switch, and wherein, after the transfer, the network node is only connected to the switch through the permanent trunk line.

2. The system of claim 1, wherein the service logic program includes an interface that allows a user to select a tone type from a plurality of tone types.

3. The system of claim 2, wherein the interface is to operate with dual tone multifrequency dialing.

4. The system of claim 2, wherein the service logic program includes a database that lists a particular tone type associated with each of a plurality of users.

5. The system of claim 2, wherein the service logic program is to monitor each of the plurality of tone types for failures.

6. The system of claim 2, wherein the service logic program is to identify and to notify the user when the tone type becomes unavailable.

7. The system of claim 1, wherein the switch includes a music-on-hold trunk.

8. The system of claim 7, wherein the call is to be placed on hold by connecting the call to the music-on-hold trunk.

9. The system of claim 8, wherein the music-on-hold trunk is to connect the call to the service logic program when the call is connected to the music-on-hold trunk.

10. The system of claim 7, wherein the music-on-hold trunk is to be physically connected to the service logic program.

11. The system of claim 1, wherein a connection between the service logic program and the switch is a multiple line hunt group (MLHG).

12. A system for providing a continuous tone in voice communication networks, comprising:
a switch configured to follow call routing/switching instructions; and
a network node including a first service logic program to provide the call routing/switching instructions and a second service logic program to provide the continuous tone to the switch,
wherein the switch is to receive an incoming call from a calling party and is to forward the incoming call to the network node,
wherein the network node is to receive the incoming call from the switch, to place an outgoing call to a called party in response to the incoming call, to connect the incoming call and the outgoing call, and to transfer the connected incoming call and the outgoing call to the switch,
wherein, during the transfer, when the network node is to direct the switch to place the incoming call and the outgoing call on hold, the second service logic program in the service node is to provide the continuous tone to the connected incoming call and outgoing call on the switch through a permanent trunk line configured to pass the continuous tone from the service logic program, and
wherein, after the transfer, the network node is only connected to the switch through the permanent trunk line.

13. The system of claim 12, wherein the switch is a service switching point adapted to place the incoming call and the outgoing call on hold by connecting the incoming call and the outgoing call to a music-on-hold trunk.

14. The system of claim 13, wherein when the incoming call and the outgoing call are connected to the music-on-hold trunk, the music-on-hold trunk is to connect to the second service logic program through a foreign exchange trunk.

15. The system of claim 13, wherein when the transfer is completed, the service switching point is to disconnect the incoming call and the outgoing call from the music-on-hold trunk and is to connect the incoming call and the outgoing call to each other.

16. A method for providing a continuous tone to parties of a voice call, comprising:
receiving an incoming call from a calling party;
placing an outgoing call to a called party in response to the incoming call;
connecting the incoming call and the outgoing call; and
transferring the connected incoming call and the outgoing call,
wherein, during said transferring, a call routing service logic program directs the switch to place incoming call and outgoing call on hold and a service logic program provides a continuous tone to at least one of the incoming call and outgoing call through a permanent trunk line connected from the service node to the switch, and
wherein, after the transfer, the network node is only connected to the switch through the permanent trunk line.

17. The method of claim 16, wherein the incoming call and the outgoing call are to be placed on hold by connecting the incoming call and the outgoing call to a music-on-hold trunk in a service switching point.

18. The method of claim 17, wherein when the incoming call and the outgoing call are connected to the music-on-hold trunk, the music-on-hold trunk is to be connected to the service logic program provisioned on a service node, and wherein the service logic program is to provide the continuous tone to said at least one party selected from the group consisting of the calling party and the called party.

19. The method of claim 17, wherein the method further comprises:
disconnecting the incoming call and the outgoing call from the music-on-hold trunk and connecting the incoming call and the outgoing call to each other at a service switching point when said transferring is completed.

20. The system of claim 1, wherein the network node is a service node of an AIN and the switch is a service switching point of the AIN.

21. The system of claim 12, wherein the network node is a service node of an AIN and the switch is a service switching point of the AIN.

22. A computer-readable medium containing software code that, when executed by a computer, causes the computer to execute a method to provide a continuous tone to one or more parties of a voice communication call, the method comprising:
receiving an incoming call from a calling party of the call to a called party of the call;
forwarding the incoming call to a call routing service logic program on a service node;
receiving, in a transfer from the service node, the incoming call and an outgoing call,
wherein, during said transferring, when a network node directs a switch to place the incoming call and the outgoing call on hold for a duration of at least one second, a service logic program is to provide the continuous tone to at least one party selected from a group consisting of the calling party and the called party through a permanent trunk line connected from the network node to the switch, and
taking the incoming call and the outgoing call off hold when the transfer is complete and disconnecting the at least one call from the continuous tone service logic program,
wherein, when the transfer is complete, the network node is only connected to the switch through the permanent trunk line.

23. The computer-readable medium of claim 22, wherein said receiving includes: connecting said at least one call to a music-on-hold trunk;
signaling from the music-on-hold trunk to a foreign exchange trunk; and
placing a call from the foreign exchange trunk to the continuous tone service logic program.

24. A computer-readable medium containing software code that, when executed by a computer, causes the computer to execute a method to provide a continuous tone to one or more parties of a voice communication call, the method comprising:
receiving an incoming call having a calling party and a called party from a switch;
placing an outgoing call to the called party;
transferring the incoming call and the outgoing call to said switch, wherein the incoming call and the outgoing call are placed on hold during said transferring; and
providing a continuous tone to at least one party selected from the group consisting of the calling party and the called party while the incoming call and the outgoing call are on hold for a duration of at least one second,
wherein, during said transferring, a network node is to direct the switch in communication with the network node to place a call on hold for a duration of at least one second, a service logic program is to provide the continuous tone to at least one party selected from a group consisting of the calling party of the call and the called party of the call while the call is on hold and while connecting the calling party to the called party to complete the call through the switch, wherein, during said transferring, when a network node directs a switch to place the incoming call and the outgoing call on hold for a duration of at least one second, a service logic program is to provide the continuous tone to at least one party selected from a group consisting of the calling party and the called party through a permanent trunk line connected from the network node to the switch, and wherein, when the transfer is complete, the network node is only connected to the switch through the permanent trunk line.

25. The computer-readable medium of claim 24, wherein said providing a continuous tone comprises: providing a continuous tone via the switch.

26. The computer-readable medium of claim 24, wherein the software code further includes instructions that, when executed by the computer, causes the method executed by the computer to further comprise:

receiving information from said at least one party to select a type of continuous tone; and wherein said providing comprises providing the type of continuous tone selected by said at least one party.

27. The computer-readable medium of claim 26, wherein said receiving information comprises:

receiving said information via dual-tone multifrequency (DTMF) signaling.

28. The system of claim 1, further comprising a permanent trunk line configured to connect the continuous tone of the service logic program of the network node to the switch.

29. The system of claim 12, further comprising a permanent trunk line configured to connect the continuous tone of the second service logic program of the network node to the switch.

30. The system of claim 1, wherein the first line is a basic rate interface (BRI) connection and the second line is a BRI integrated service digital network connection.

31. The system of claim 12, wherein the first line is a basic rate interface (BRI) connection and the second line is a BRI integrated service digital network connection.

32. The system of claim 16, wherein the first line is a basic rate interface (BRI) connection and the second line is a BRI integrated service digital network connection.

33. The system of claim 22, wherein the first line is a basic rate interface (BRI) connection and the second line is a BRI integrated service digital network connection.

34. The system of claim 24, wherein the first line is a basic rate interface (BRI) connection and the second line is a BRI integrated service digital network connection.

* * * * *